Patented Oct. 13, 1953

2,655,497

UNITED STATES PATENT OFFICE 2,655,497

TREATMENT OF STREPTOMYCIN SOLUTIONS

Philip Dalton Coppock, Epsom, Lily Mulligan, New Malden, John Talbot McCombie, London, and Alan Gilbert White, Bristol, England, assignors to The Distillers Company Limited, Edinburgh, Scotland, a British company No Drawing. Application December 8, 1947, Serial No. 790,444. In Great Britain December 11, 1946

6 Claims. (Cl. 260—210)

This invention relates to the concentration and recovery of streptomycin from its aqueous solution, in particular from broth solutions in which or on which streptomycin producing organisms have been cultured.

Previously it had been known to separate streptomycin from solutions by agitating the same with suspended activated carbons. The streptomycin became adsorbed on the carbon and after filtration was eluted from the carbon by means of alcoholic hydrochloric acid. When broth was subjected to this treatment it was necessary to separate therefrom any insoluble solid which being extremely fine and gelatinous, made filtration of the carbon and subsequent elution of the adsorbed streptomycin very difficult. Furthermore, when the streptomycin-rich carbon, after separation from the solution medium, was eluted with the said alcoholic hydrochloric acid the elution efficiency scarcely ever exceeded 30% of the streptomycin initially present.

According to the present invention there is provided a process for the concentration and recovery of streptomycin from solutions thereof which comprises passing the solution, adjusted to a pH not less than about 3 through a mass of coarse activated carbon, maintained in a substantially static condition and subsequently eluting the adsorbed streptomycin from the static mass of activated carbon by means of a dilute solution of an acid, having a pH not greater than about 2.

The streptomycin solution which is employed in the process of the present invention is preferably an aqueous solution thereof, for example a broth solution or it may also be any streptomycin-containing solution obtained by the treatment of a broth solution, for example, by processing the broth solution according to the process of the invention. Alternatively an aqueous-organic solvent or organic solvent, for example an aqueous-acetone, methanol or ethanol, solution of streptomycin may be employed. The mesh size of the activated carbon forming the mass should preferably be from 20–60 meshes per linear inch or even coarser, and it has been found that a mesh size of 20–40 meshes per linear inch gives very good results. The mesh size of the carbon has apparently no direct influence on the efficiency of the process except that unless the carbon is reasonably coarse filtration of the liquid through the mass will be very slow and if the carbon employed were very fine clogging of the mass would have been found to be especially suitable for the process of the present invention. By this term is meant any activated carbon produced by a process which includes the chemical dehydration of carbohydrate, and apparently almost any carbohydrate of vegetable or plant origin can be made to yield an active carbon by suitable treatment. Examples of dehydrating agents which may be used include magnesium chloride, phosphoric acid, silver nitrate, zinc chloride, calcium chloride, and calcium oxide. It is to be noted that when these chemically activated carbons are used the total anti-biotic activity in the solution after elution is greater than that prevailing therein before the adsorption. This increase of activity appears to be specific to activated carbons the activation of which has been achieved by known treatment with chemical substances such as phosphoric acid and zinc chloride. It does not appear to occur, at any rate to an appreciable extent, with carbons which have been activated by treatment with steam.

It is to be noted that the adsorption of the streptomycin by these chemically activated carbons may also be carried out by agitating the solution containing it with the carbon and separating the latter subsequently from the liquid and desorbing the streptomycin from the carbon.

As far as the choice of pH is concerned it is pointed out that some streptomycin may be adsorbed on carbon from solutions thereof at pH lower than 3, but under such acid conditions the adsorption of the streptomycin on the carbon is very slight. Similarly streptomycin adsorbed on carbon may be eluted at a pH greater than 2, but at the higher pH values the streptomycin tends to remain on the carbon, rather than be eluted into the solution. It is seen therefore that the choice of pH conditions is not so much conditioned by criticality as by the necessity of carrying out the process in a reasonably efficient and economic manner. Preferably the solution before adsorption should have a pH in the ranges 6–9, and before elution have a pH between 1 and 2.

As acids for the desorption of the streptomycin from the adsorbent carbon there may be used, for instance, easily volatilizable acids such as hydrochloric acid, formic acid and the like, in which case organic solvents such as ethanol and methanol may serve with advantage as diluent. Preferably the adsorbed streptomycin is eluted with an aqueous solution of an acid which is capable of forming an insoluble alkaline earth metal salt, for example, sulphuric acid and phosphoric acid. However, the acid may be employed either in aqueous, aqueous-organic solvent or alcoholic solution, and preferably in aqueous-methanolic, -ethanolic or -acetone, or in low molecular weight aliphatic alcoholic solution, provided that this acid solution is dilute and is capable of dissolving the streptomycin or streptomycin solid formed and is, in addition, in an ionised form. The use of methanolic or ethanolic solutions of mineral acids for example hydrogen chloride has been found to be effective. The acid which may be employed need not be a mineral acid and strong (i. e. which dissociates completely in aqueous solution) organic acids such as formic acid and trichloracetic acid have been found to be suitable for the process. It is to be understood that acids which decompose, destroy or deteriorate the streptomycin, even in dilute solution, for example nitric acid, as such are excluded from the scope of the present invention.

Although greater acid concentrations are more effective for removing the streptomycin from the adsorbent it has to be borne in mind that the more concentrated the acid, the greater will be the amount of the base which is required for the subsequent neutralisation of the acid. The concentration of the acid for the elution is preferably maintained between 0.2% and 10% by weight, most suitably in the range from 0.6 to 2%, although it has been found that aqueous 0.8% w./v. sulphuric acid is especially suitable. The term w./v. stands for weight by volume, and as applied to the aqueous 0.8% w./v. sulphuric acid solution represents the solution obtained by adding 0.8 gram of sulphuric acid to 100 milliliters of water. This solution is about 0.8% sulphuric acid in water. The elution is preferably carried out at a temperature below 50° C., for example at room temperature. The mass of activated charcoal through which the streptomycin solution is passed for the purpose of adsorbing the streptomycin is advantageously disposed in such a manner that its height is greater than its width. Towers or columns with a comparatively small internal diameter charged with the activated carbon have proved most useful for the purpose.

A preferred method of carrying out the process of the invention comprises passing the streptomycin solution through the activated charcoal bed or column in one direction, advantageously from the bottom to the top of the bed, and the from acid solution in the opposite direction, e. g. from the top towards the bottom of the bed. In this way where a solution of streptomycin which is not sufficient to saturate more than a part of the carbon layer is passed through the layer in one direction, all the streptomycin will be adsorbed at the near end of the mass and thus elution in the opposite direction will achieve satisfactory removal in a more concentrated form of the adsorbed material, whereas if the mass were eluted in the same direction, the adsorbed streptomycin would have to pass through the rest of the carbon mass before being recovered and would thus be obtained in a less concentrated form.

When using dilute aqueous sulphuric or phosphoric acid solutions for the elution of the streptomycin adsorbed by the activated charcoal, the acid is conveniently neutralised by treatment with or passage through an acid removing resinous material such as "Deacidite" (registered trade-mark) or by the addition of suitable barium or calcium compounds, such as the oxide, hydroxide or carbonate, or the salts of weak organic acids such as acetic acid, known to form substantially insoluble salts with the particular acid. Such compounds are added to the solution until the pH value therein is within the range of between 5 and 8.

A pH of about 5 to 6 will be obtained when a carbonate or other weak acid salt of the base is used whilst a pH value of 6 to 8 should be aimed at when the oxides or hydroxides are used. In this way, all the free strong acid is neutralised whilst the acid which is combined with the streptomycin remains unreacted upon. Free organic acids may subsequently be removed by any convenient method, for instance, by vaporisation in vacuo.

After elution with dilute acid solutions for the removal of the adsorbed streptomycin from the mass of activated charcoal, the latter may be used again for the treatment of a further batch of streptomycin solution for the adsorption of streptomycin therefrom.

Using a chemically activated carbon even after 16 cycles the activate dcarbon shows an adsorption efficiency of 95 to 98% and an elution efficiency of 100% or more. This high elution efficiency is due to the acid activation of the streptomycin solution by adsorption on the mass of the chemically activated carbon.

This activation effect is particularly noticeable when the streptomycin is adsorbed on a chemically activated carbon for example one which has been prepared and activated by treatment with phosphoric acid and the streptomycin eluted from the carbon by an acid, as described above, whereupon the total anti-biotic activity obtained in the eluate is greater than that of the initial solution.

Moreover, the surprising discovery has been made that when streptomycin solutions, the potency of which had been increased by the treatment with acid, were subjected to the adsorption and elution treatment according to the process of this invention, a further increase in the total potency was obtained.

Although this activation effect can be achieved by suspending a carbon in the streptomycin solution and subsequently eluting the material adsorbed on the carbon, it has been found that the activation effect is more marked when a column or tower of the chemically activated carbon is used.

It is advisable in using the static carbon mass according to the invention to remove the bulk of the suspended matter in the solution preliminary to the passage through the activated carbon mass, since such suspended matter causes clogging of the carbon mass or similar operational difficulties where it is present in the solution. This may be carried out for example by filtration, with or without pretreatment with a filter aid material such as kieselguhr, or by centrifuging.

The following examples illustrate ways in which the invention may be carried into effect.

EXAMPLE 1

1500 cc. of a culture liquid of *Streptomyces griseus* of pH 8.2 which had been clarified by centrifuging are passed through a column of phosphoric acid activated carbon 25 cm. high and 2 cm. diameter. The column is washed with small amounts of water and then eluted with 500 cc. of 0.8% sulphuric acid. The temperature was room temperature varying from 15° to 25° C. In this way a number of batches of *Streptomyces griseus* culture were tested. The adsorption was carried out with three different kinds of activated carbon which are sold under the trade names "Actibon C," "Actibon Special" and "Sutcliffe and Speakman G." The results are shown in Table I from which it can be seen that in every case the number of streptomycin units eluted from the carbons used is greater than the number of units originally fed to the columns and that activation has occurred during the elution stage.

EXAMPLE 2

A culture liquid produced with *Streptomyces griseus* was acidified to a pH value of 2 and allowed to stand for some hours. After neutralisation and adjustment of the pH to 7.9 it was then passed in an upwards direction through a column of activated carbon. After the passage of the solution, the activated carbon was washed with distilled water, and then eluted with dilute aqueous sulphuric acid. The results of various batches treated in exactly the same way are shown in Table II. All the carbons used in this example are phosphoric acid activated carbons.

*Table II*

| Carbon | Titre of feed after acid treatment u./cc. | Titre of effluent, u./cc. | Adsorption efficiency, percent | Total units adsorbed | Total units eluted | Apparent elution efficiency, percent |
|---|---|---|---|---|---|---|
| Actibon C | 180 | 57 | 68 | 183,000 | 232,000 | 126 |
| Actibon "spec" | 180 | 71 | 60 | 163,000 | 193,000 | 118 |
| S. & S. "G" | 180 | 69 | 61 | 166,000 | 202,000 | 124 |
| Actibon C | 68 | 42 | 38 | 65,00 | 102,000 | 157 |
| Actibon "spec" | 68 | 49 | 28 | 48,000 | 95,000 | 200 |
| S. & S. "G" | 68 | 52 | 23 | 40,000 | 88,000 | 220 |

EXAMPLE 3

Four experiments were carried out using a tower of 5 feet height and 4 inches internal diameter, packed with a chemically activated carbon of mesh size 20–40 meshes per linear inch. Adsorption was carried out by passing broth, from which the bulk of the suspended matter had been removed, upwardly through the tower, when adsorption was complete the column was washed with tap water and then eluted with 0.8% w/v sulphuric acid in an amount of the order of 12 gallons. The particular conditions employed in each experiment and the results obtained are given in the tabular form below:

| Experiment | Type of carbon used | Cycle No. | Broth | | | | Efficiencies, percent | | |
|---|---|---|---|---|---|---|---|---|---|
| | | | pH | Titre, u./ml. | Feed rate, gallons/hr. | Total volume, gallons | Adsorption | Elution | Overall |
| 1 | Actibon C | 1 | 7.4 | 86 | 10 | 45 | 98 | 157 | 154 |
| 2 | do | 2 | 8.4 | 57 | 10 | 43 | 99 | 163 | 162 |
| 3 | S & S "G" | 1 | 7.3 | 104 | 16 | 40 | 98 | 114 | 112 |
| 4 | do | 2 | 8.75 | 54 | 20 | 44 | 99 | 151 | 150 |

*Table I*

| Carbon | Titre of feed units/cc. | Titre of effluent, units/cc. | Adsorption efficiency, percent | Total units adsorbed | Total units eluted | Apparent elution efficiency, percent |
|---|---|---|---|---|---|---|
| Actibon C | 68 | 6 | 91 | 93,000 | 198,000 | 213 |
| Actibon "spec." | 68 | 7 | 90 | 91,500 | 187,000 | 204 |
| S. & S. "G" | 68 | 4 | 94 | 96,000 | 219,000 | 228 |
| Actibon C | 76 | 3 | 96 | 109,000 | 191,000 | 175 |
| Actibon "spec." | 76 | 8 | 90 | 102,000 | 173,000 | 169 |
| S. & S. "G" | 76 | 9 | 88 | 100,500 | 165,000 | 164 |
| Actibon C | 73 | 1 | 99 | 108,000 | 139,000 | 128 |
| Actibon "spec." | 73 | 1 | 99 | 108,000 | 138,000 | 128 |
| S. & S. "G" | 73 | 1 | 99 | 106,000 | 152,000 | 140 |
| Actibon C | 117 | 9 | 92 | 162,000 | 207,000 | 128 |
| Actibon "spec." | 117 | 11 | 91 | 159,000 | 216,000 | 136 |
| S. & S. "G" | 117 | 11 | 91 | 159,000 | 208,000 | 131 |
| Actibon C | 95 | 13 | 86 | 123,000 | 148,000 | 120 |
| Actibon "spec." | 95 | 17 | 82 | 117,000 | 166,000 | 142 |
| S. & S. "G" | 95 | 16 | 83 | 118,500 | 164,000 | 138 |
| S. & S. "G" | 58 | .6 | 99 | 86,500 | 254,600 | 306 |

All the carbons used in this example are phosphoric acid activated carbons.

In Experiments 1 and 4 the broth had been clarified before adsorption by treatment with kieselguhr followed by filtration on a filter press, and in Experiments 2 and 3 the broth had been clarified by centrifuging. The "cycle number" given in the table indicates the number of times the carbon tower had been used. It is to be noted that the efficiency figures given above are calculated with respect to the titre of the broth and that no allowance has been made for the activation of the streptomycin solutions which undoubtedly takes place by the adsorption and elution of this phosphoric acid activated carbon. The eluate from the tower is collected in fractions as in general about the first and last thirds of the total eluate obtained from the tower contain very little streptomycin, whereas the middle third contains the bulk of the streptomycin. Consequently, the eluate fractions obtained from the tower are bulked according to their titre, the bulked fractions of titre less than about 1000 u./ml. being neutralised with sodium hydroxide and resupplied to the tower with the feed for the next run; the bulked fractions of titre greater than 1000 u./ml. being neutralised with baryta, the barium sulphate filtered off, the filtrate concentrated by distillation under high vacuum and the streptomycin obtained from the resulting concentrate by precipitation with acetone.

EXAMPLE 4

1500 ccs. of culture of *Streptomyces griseus* are passed through a column of zinc chloride activated carbon 25 cm. high and 2 cm. diameter. The column is washed with small amounts of water and then eluted with 500 ccs. of 0.8% sulphuric acid. The temperature was room temperature varying from 18° to 25° C. The procedure followed was the same as that in Example 1 and the results obtained are given in the table below.

| Carbon employed in the column | Cycle No. | Broth pH | Broth Total units present | Total units in effluent | Total units eluted |
|---|---|---|---|---|---|
| Phosphoric acid activated carbon | 1 | 6.5 | 39,000 | 4,500 | 140,500 |
|  | 2 | 6.5 | 52,000 | 10,000 | 102,000 |
|  | 3 | 6.5 | 52,000 | 22,000 | 112,000 |
| Zinc chloride activated carbon | 1 | 6.5 | 39,000 | 3,600 | 62,000 |
|  | 2 | 6.5 | 52,000 | 6,000 | 68,000 |
|  | 3 | 6.5 | 52,000 | 6,000 | 65,000 |

The results given in the above table for a phosphoric acid activated carbon were obtained in exactly the same way as with the zinc chloride activated carbon, and are quoted above to give a comparison of the efficiencies of the two carbons.

EXAMPLE 5

The process of Example 4 is carried out wherein magnesium chloride activated carbon or calcium chloride activated carbon is substituted for the zinc chloride activated carbon. The results obtained show that these carbons are equally as efficient as the zinc chloride activated carbon.

EXAMPLE 6

The process of Example 1 is carried out using aqueous-methanol, aqueous-ethanol or aqueous acetone solutions of streptomycin are substituted for the aqueous solution of streptomycin used therein. By using these solutions, results essentially commensurate with those given in Example 1 are obtained.

EXAMPLE 7

The process of Example 1 is carried out using aqueous, aqueous-methanol, aqueous-ethanol or aqueous-acetone solutions of sulphuric acid in place of the aqueous 0.8% w./v. sulphuric acid solutions used therein for eluting the adsorbed streptomycin from the carbon. It was found that these eluting acid solutions were almost as efficient as the aqueous 0.8% w./v. sulphuric acid solution used in Example 1.

EXAMPLE 8

In the process of any of the above examples dilute solutions of phosphoric acid or formic acid is substituted for the dilute sulphuric acid solutions used therein for eluting the adsorbed streptomycin from the carbon.

EXAMPLE 9

2000 ccs. of a culture liquid of *Streptomyces griseus* was filtered and to the filtrate adjusted to a pH 8, 1% of phosphoric acid activated carbon of mesh size 100 meshes per linear inch was added and the solution agitated and then allowed to stand at room temperature. The solution was filtered through a large Buchner funnel care being taken to ensure that the whole of the carbon was transferred to the filter, and the carbon on the filter washed with tap water. After this washing the carbon was suspended in 500 ccs. of 0.8% sulphuric acid and agitated, the solution then filtered and the carbon washed with a small amount of distilled water the washings being added to the filtrate. This filtrate was neutralized with baryta, the barium sulphate filtered off, the filtrate concentrated by distillation under high vacuum and the streptomycin obtained from the resulting concentrate by precipitation with acetone.

The degree of concentration obtained by the process of the present invention depends on the streptomycin content in the initial solution; a low content in the former produced a greater degree of concentration than is the case when the initial solution has a high streptomycin content.

The term "aqueous" as used in the claims is intended to cover aqueous, organic solvent solutions such as aqueous methanol, -ethanol, -acetone, solutions as well as aqueous solutions per se; and the term streptomycin used in the body of the specification and claim is intended to cover streptomycin salts and other forms of the streptomycin as well as streptomycin per se.

What we claim is:

1. A process for the concentration and recovery of streptomycin from solutions thereof, which comprises passing a filtered streptomycin-containing broth, obtained by mould culture, adjusted to a pH of 6 – 9, through coarse chemically activated carbon selected from the class consisting of phosphoric acid activated carbon, magnesium chloride activated carbon, calcium chloride activated carbon, zinc chloride activated carbon, silver nitrate activated carbon and calcium oxide activated carbon, the activated carbon having a mesh size coarser than 60 meshes per linear inch and being maintained in a substantially static condition, and subsequently eluting the adsorbed streptomycin from the static mass of activated carbon by means of a dilute aqueous solution of an acid having a pH not greater than about 2.

2. A process according to claim 1, wherein the activated carbon is in the form of a column, the length of which is greater than its diameter.

3. A process according to claim 1, wherein the acid constituent of the elution solution is selected from the group consisting of phosphoric acid and sulphuric acid.

4. A process according to claim 1, wherein the elution solution is of a pH in the range 1 to 2.

5. A process for the concentration and recovery of streptomycin from solutions thereof, which comprises passing a filtered streptomycin-containing broth, obtained by mould culture, adjusted to a pH of 6 – 9, through coarse phosphoric acid activated carbon of a mesh size coarser than 60 meshes per linear inch and maintained in a substantially static condition, and subsequently eluting the adsorbed streptomycin from the static mass of activated carbon by means of a dilute aqueous solution of an acid having a pH in the range 1 to 2.

6. A process according to claim 5, wherein the phosphoric acid activated carbon is in the form of a column, the length of which is greater than its diameter.

PHILIP DALTON COPPOCK.
LILY MULLIGAN.
JOHN TALBOT McCOMBIE.
ALAN GILBERT WHITE.

References Cited in the file of this patent

UNITED STATES PATENTS

| Number | Name | Date |
|---|---|---|
| 2,461,922 | Rake et al. | Feb. 15, 1949 |
| 2,521,770 | Babson et al. | Sept. 12, 1950 |

OTHER REFERENCES

Kuehl, J. Amer. Chem. Soc., v. 68 (Aug. 1946), pages 1460–1462.

Perlman et al., J.A.C.S., v. 70 (1948), page 3968.

Perry "Chemical Engineers' Handbook," Sec. Ed., 1941, pages 1278, 1302, 2 pages.

Waksman et al., Proc. Soc. Exptl. Biol. & Med., vol. 49 (1942), pg. 210.

Waksman et al., J. Am. Pharm. Assoc., vol. 34, (1945), page 279.

Carter et al., J. Biol. Chem., vol. 160 (1945), pgs. 337–342, 6 pages.

Vander Brook et al., J. Biol. Chem., vol. 165 (1946), pgs. 463–468, 6 pages.